(12) United States Patent
Cao

(10) Patent No.: US 8,213,997 B2
(45) Date of Patent: Jul. 3, 2012

(54) SLIDE TYPE MOBILE PHONE

(75) Inventor: Xiang Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 34 days.

(21) Appl. No.: 12/825,421

(22) Filed: Jun. 29, 2010

(65) Prior Publication Data

US 2011/0269505 A1 Nov. 3, 2011

(30) Foreign Application Priority Data

Apr. 28, 2010 (CN) .......................... 2010 1 0158747

(51) Int. Cl.
*H04W 4/00* (2009.01)

(52) U.S. Cl. ........ 455/566; 345/156; 345/1.3; D14/328; D14/329; D14/316; D14/250; D14/248; D14/140.11; D14/140; D14/138 G; D14/138 AD; D14/138 R

(58) Field of Classification Search .................. 455/566; 345/156, 1.1, 1.3; D14/328, 329, 138 G, D14/140, 140.11, 138 AD, 138 R, 248, 250, D14/316

See application file for complete search history.

(56) References Cited

U.S. PATENT DOCUMENTS

2006/0197714 A1* 9/2006 Chang ........................... 345/1.1
\* cited by examiner

*Primary Examiner* — Pierre-Louis Desir
(74) *Attorney, Agent, or Firm* — Altis Law Group, Inc.

(57) ABSTRACT

A mobile phone includes a main display; a subsidiary display; and a main body mounted between the main display and the subsidiary display. The subsidiary display is retractable along a first direction relative to the main display, and the main body is retractable along a second direction perpendicular to the first direction.

6 Claims, 6 Drawing Sheets

SLIDE TYPE MOBILE PHONE

BACKGROUND

1. Technical Field

The present disclosure relates to mobile phones, and more particularly to a slide type mobile phone.

2. Description of Related Art

Recently, a mobile phone capable of providing wireless communication services has become almost a necessity in our society and various types of mobile phones are manufactured to comply with the different tastes of different people (e.g., bar type, flip type, folder type, etc.).

A bar type mobile phone, since its keypad is exposed, can easily be damaged or the keypad can be pressed by mistake. A flip type mobile phone, although it was introduced to solve this problem and equipped with a flip to protect the keypad by covering it, shares another problem with the bar type mobile phone that its main body is still too long for convenient transport. Further, the flip type mobile phone fails to satisfy the demand for a larger display screen required for ease of Internet access, etc.

Thus, a folding type mobile phone has been introduced to shorten the length of the main body of a bar type phone or a flip type phone. However, the hinges that connect the upper folder and the lower folder can easily be damaged because these folding phones have to be opened and closed repeatedly for every use or call.

A slide type mobile phone has been proposed for solving the above problem. A conventional slide type mobile phone includes a main body, a slidable cover capable of covering the keypad and the liquid crystal display of the main body. The slidable cover can cover the keypad and the LCD in a retracted position or slide to expose the keypad and the LCD so that it can be used.

However, the conventional slide type mobile phone still fails to satisfy the demand for a larger display screen. There is still room for improving the configuration of the mobile phone.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
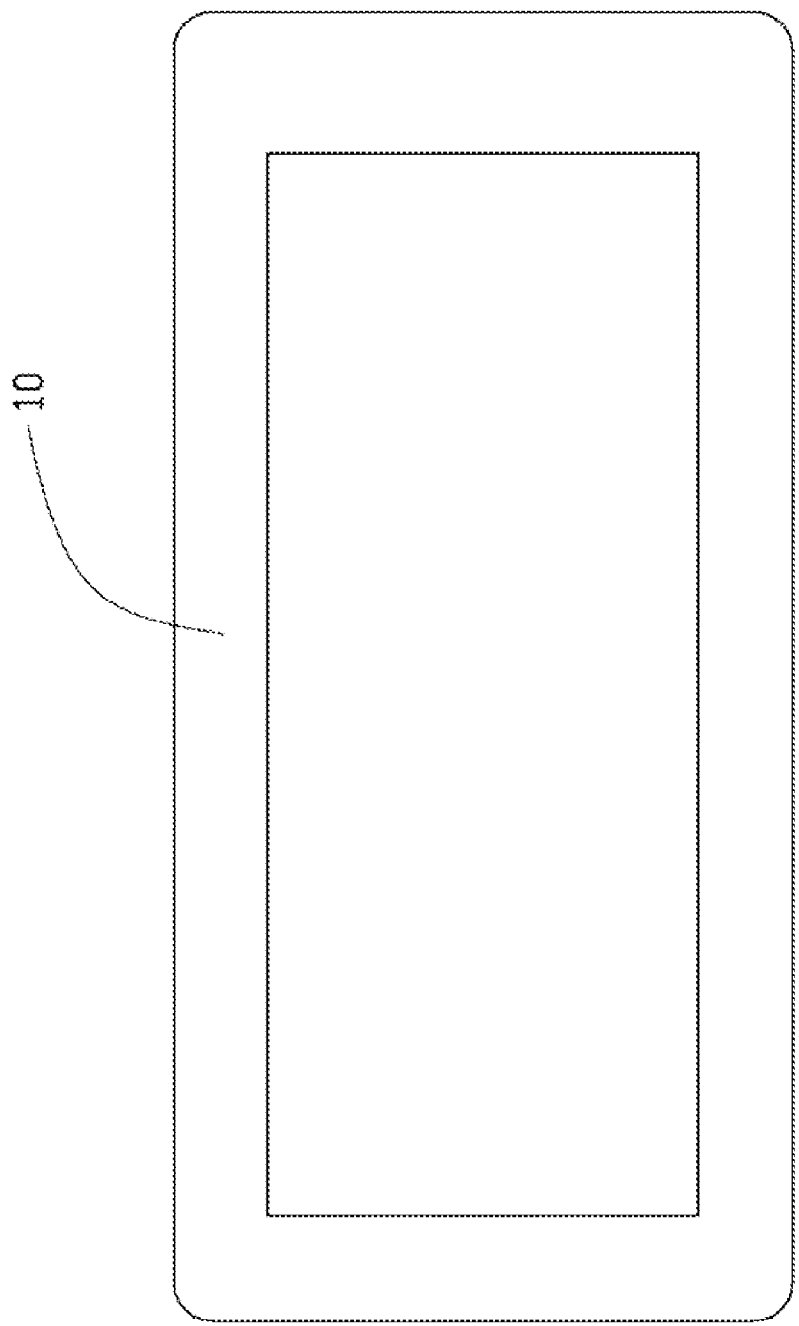
FIG. 1 illustrates a slide type mobile phone under an original retracted state according to an embodiment of the present disclosure.
Figure 2:
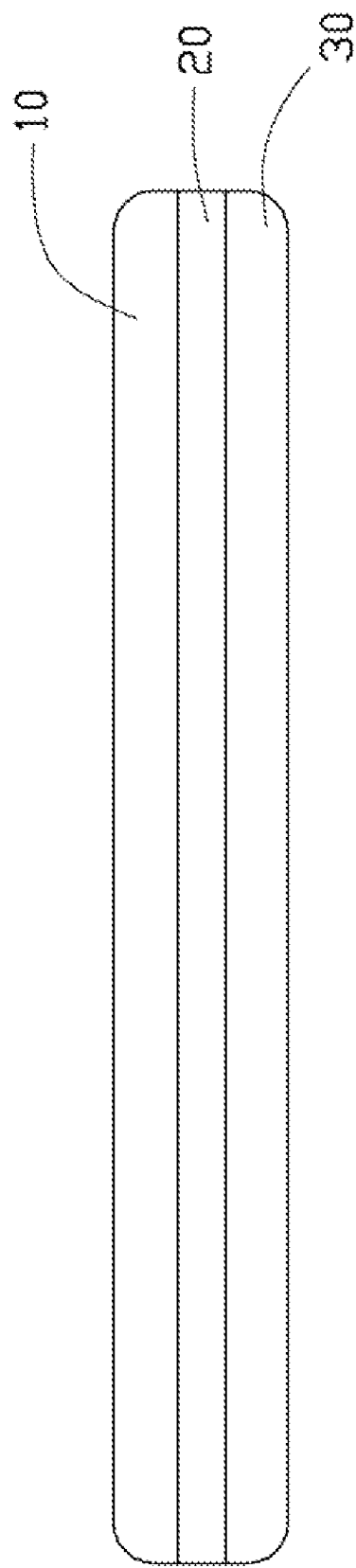
FIG. 2 is a side view of the mobile phone of FIG. 1.

Referring to FIGS. 1 and 2, an embodiment of a slide type mobile phone includes a main display 10, a main body 20, and a subsidiary display 30. The main body 20 is slidably mounted between the main display 10 and the subsidiary display 30. When the mobile phone is in an original retracted position, the main body 20 is covered by the main display 10, and the subsidiary display 30 is covered by the main body 20.

Figure 3:
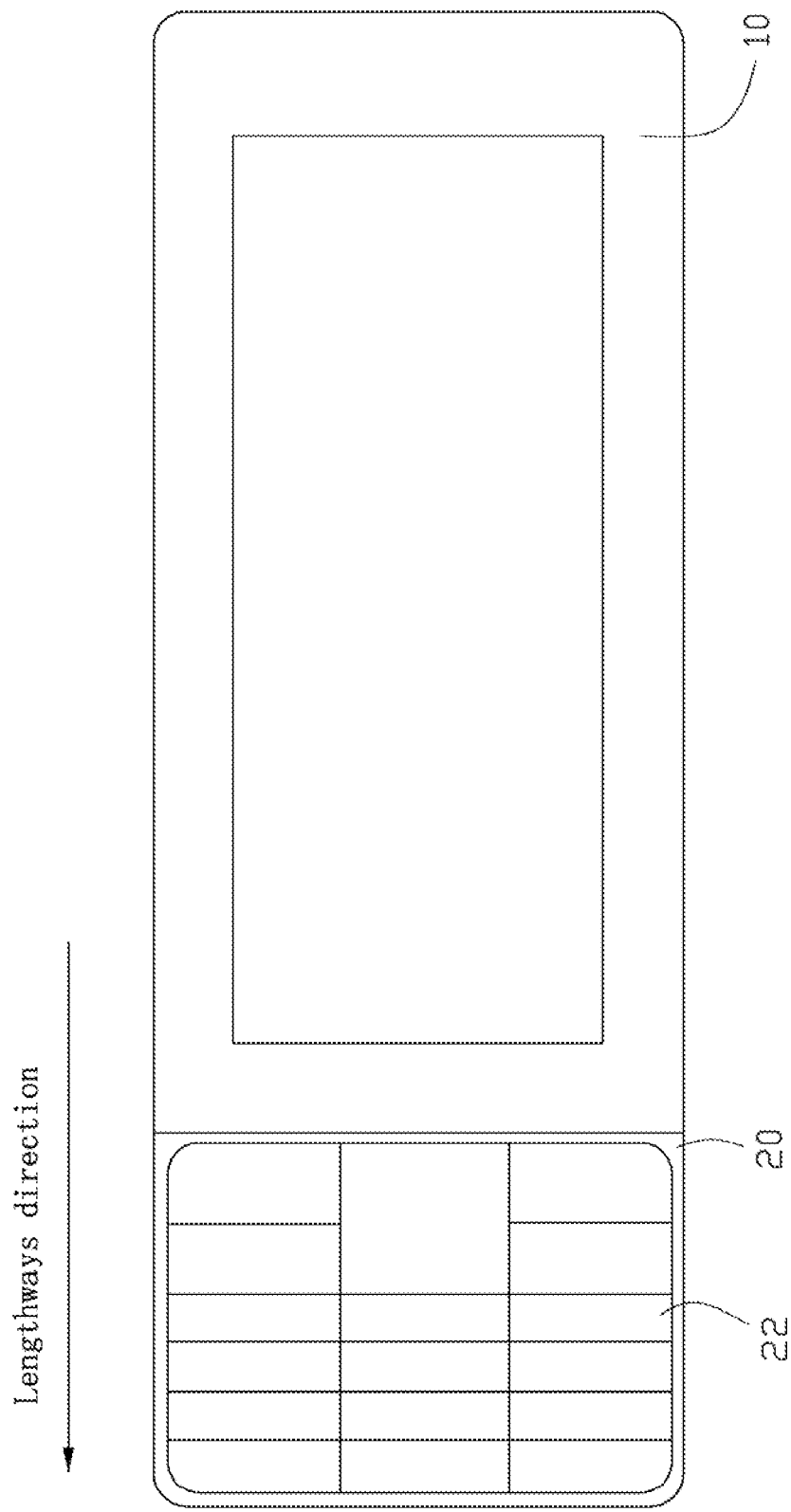
FIG. 3 illustrates a slide type mobile phone with its main body sliding to an extended state according to an embodiment of the present disclosure.
Figure 4:
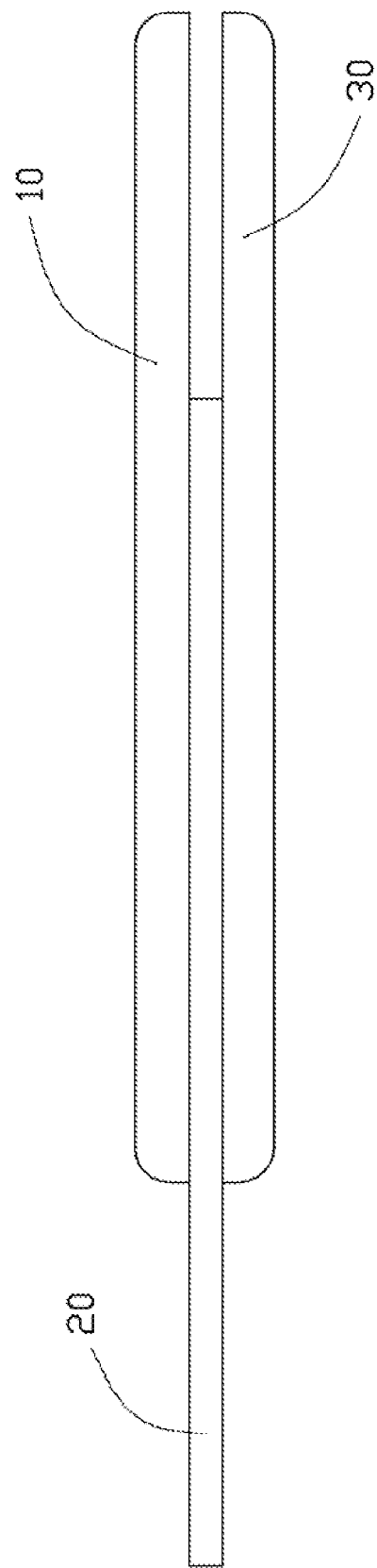
FIG. 4 is a side view of the embodiment shown in FIG. 3.

Referring to FIGS. 3 and 4, the main body 20 can slide between the main display 10 and the subsidiary display 30 to its extended position lengthways. The main body 20 includes a keypad 22 and a main circuit board (not shown) installed therein. The keypad 22 includes a plurality of keys. At the extended position, all the keys of the keypad 22 are exposed below the main display 10. In one embodiment, a first lengthways sliding structure is located between the main display 10 and the main body 20, and a second lengthways sliding structure is disposed between the main body 20 and the subsidiary display 30. Thereby, the main body 20 can slide between the main display 10 and the subsidiary display 30 along the lengthways direction. The lengthways sliding structures may utilize sliding slots and/or sliding posts, allowing for sliding to occur along those slots and/or posts.

Figure 5:
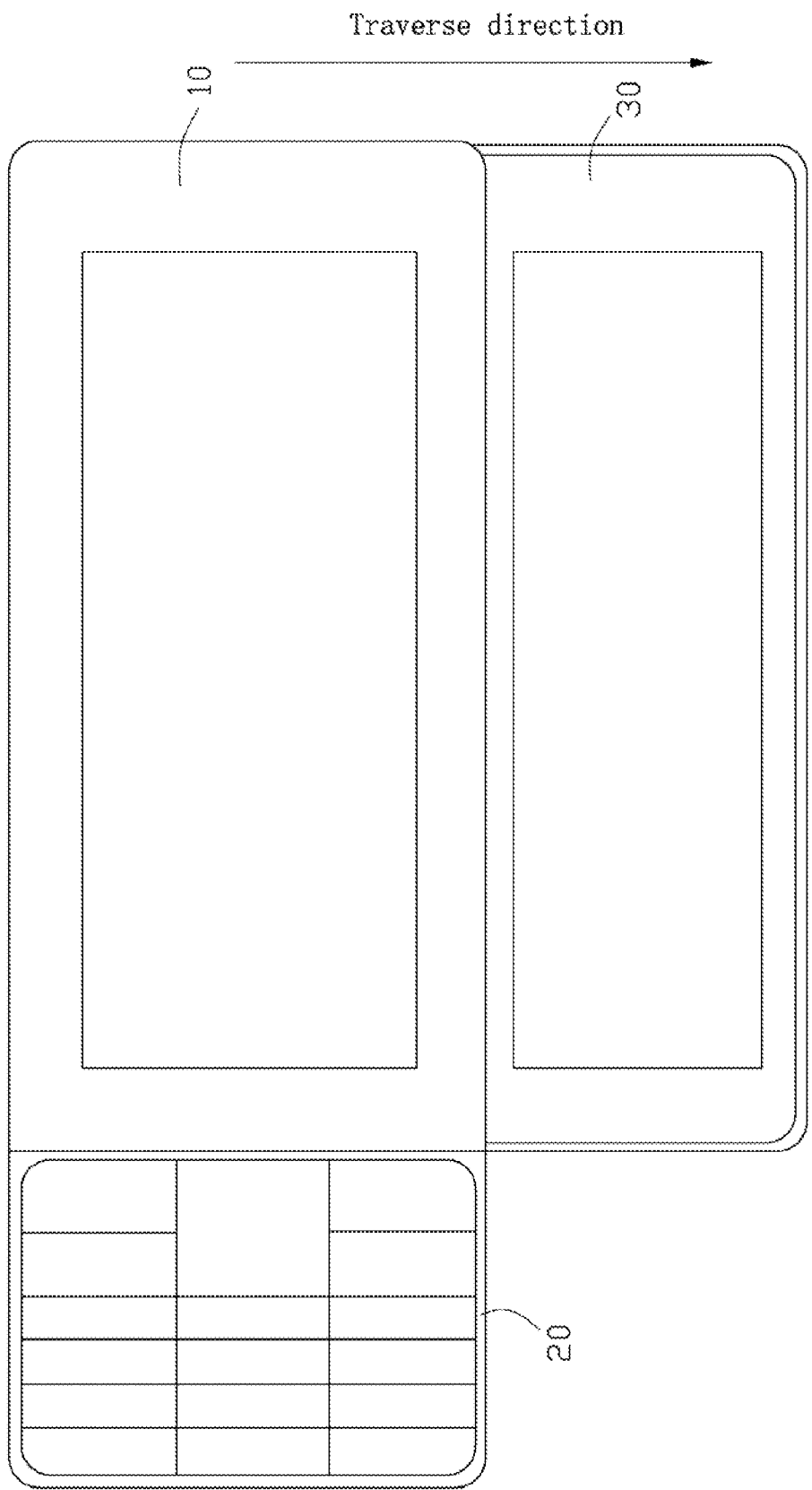
FIG. 5 illustrates a slide type mobile phone with its main body and subsidiary display sliding to their extended states according to an embodiment of the present disclosure.
Figure 6:
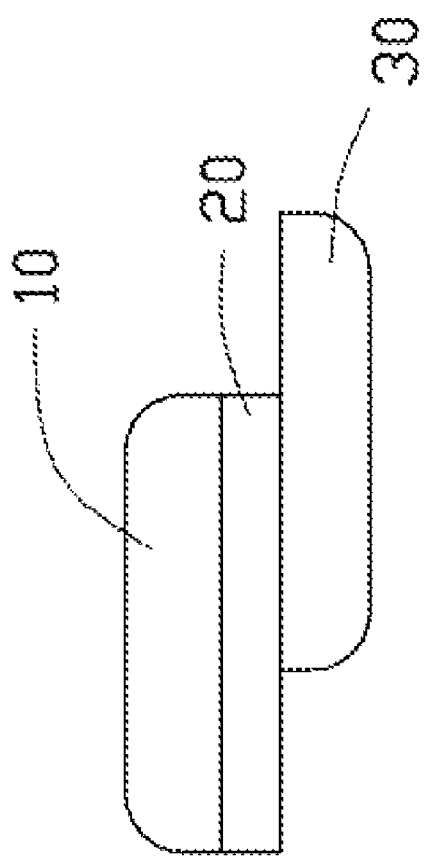
FIG. 6 is a bottom view of the mobile phone in FIG. 5.

Referring to FIGS. 5 and 6, the subsidiary display 30 can slide from the main body 20 to its extended position along a traverse direction from the main body 20. The subsidiary display 30 is exposed and located beside the main display 10 in its extended position. The length of the main display 10 is equal to that of the subsidiary display 30. The width of the main display 10 is approximately equal to that of the main body 20. The subsidiary display 30 can be a backup display used instead of the main display 10. The main display 10 and the subsidiary display 30 can also form a wider display screen collectively. In one embodiment, a traverse sliding structure is located between the main body 20 and the subsidiary display 30. Thereby the subsidiary display 30 can slide along the traverse direction. The traverse sliding structure may adopt sliding slots and sliding posts along the sliding slots or other sliding structures.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A mobile phone comprising:
   a first display;
   a second display;
   and a main body, slidably mounted between the first display and the second display, comprising a keypad and a main circuit board;
   wherein the second display is slidable along a first direction to an unfolded position where the first display and the second display jointly form a unified display, and the main body is slidable along a second direction perpendicular to the first direction to an extended position where the keypad is exposed and a length of the mobile phone is increased;
   wherein the keypad is covered by the first display when the mobile phone is at a retracted position, and wherein the second display is covered by the main body when the mobile phone is at an original retracted position; and the second display is exposed and disposed beside the first display when the second display is slid along the first direction to the unfolded position.

2. The mobile phone of claim 1, wherein a length of the first display is equal to that of the second display, and a width of the first display is equal to that of the main body.

3. A mobile phone comprising:
a main body comprising a keypad;
a first display slidably attached to a front side of the main body;
and a second display slidably attached to a rear side of the main body;
  wherein the second display is slidable along a first direction relative to the main body to an unfolded position where the first display and the second display jointly form a unified display;
  and the main body is slidable along a second direction relative to the first display to an extended position where the keypad is exposed and a length of the mobile phone is increased;
  wherein the keypad is covered by the first display when the mobile phone is at a retracted position, and wherein the second display is covered by the main body when the mobile phone is at an original retracted position; and the second display is exposed and disposed beside the first display when the second display is slid along the first direction to the unfolded position.

4. The mobile phone of claim 3, wherein a length of the first display is equal to that of the second display, and a width of the first display is equal to that of the main body.

5. The mobile phone of claim 3, wherein the first direction is perpendicular to the second direction.

6. The mobile phone of claim 3, wherein front surfaces of the first display and the second display lie in two parallel planes no matter whether the second display is in or not in the unfolded position.

* * * * *